(12) United States Patent
Bosa et al.

(10) Patent No.: US 6,658,954 B1
(45) Date of Patent: Dec. 9, 2003

(54) DUAL MOTOR PHASE CONTROLLED REVERSING TRANSMISSION

(75) Inventors: Roland Bosa, Fremont, CA (US); David McVicar, El Dorado, CA (US); David Wegmuller, Union City, CA (US)

(73) Assignee: Logitech Europe S.A. (CH)

( * ) Notice: Subject to any disclaimer, the term of this patent is extended or adjusted under 35 U.S.C. 154(b) by 0 days.

(21) Appl. No.: 10/179,398

(22) Filed: Jun. 24, 2002

(51) Int. Cl.$^7$ .............................. F16H 55/18
(52) U.S. Cl. .................. 74/409; 74/665 A; 74/665 B; 318/437
(58) Field of Search .................. 74/409, 665 A, 74/665 B; 318/10, 15, 437, 630

(56) References Cited

U.S. PATENT DOCUMENTS

| | | | | |
|---|---|---|---|---|
| 3,310,998 A | * | 3/1967 | Harmening | 74/409 |
| 3,434,025 A | * | 3/1969 | Parkinson et al. | 318/630 |
| 3,576,106 A | * | 4/1971 | Nowicki | 74/661 |
| 3,889,549 A | * | 6/1975 | Fieuzal et al. | 74/409 |
| 3,992,961 A | * | 11/1976 | Saito | 74/409 |
| 4,520,910 A | * | 6/1985 | deHertel Eastcott et al. | 74/661 |
| 4,858,490 A | * | 8/1989 | Grant | 74/665 B |
| 5,134,346 A | * | 7/1992 | Schneider et al. | 318/15 |
| 5,138,904 A | * | 8/1992 | Lande et al. | 74/665 B |

* cited by examiner

Primary Examiner—Charles A. Marmor
Assistant Examiner—Dennis Abdelnour
(74) Attorney, Agent, or Firm—Townsend and Townsend and Crew LLP (57) ABSTRACT

Embodiments of the present invention are directed to gear based transmission apparatus that are configured to reduce or eliminate the backlash effects. In one embodiment, a transmission apparatus comprises a follower gear, a first drive gear set coupled with the follower gear to drive the follower gear, and a second drive gear set coupled with the follower gear to drive the follower gear. The first drive gear set includes at least one gear, and the second drive gear set includes at least one gear. A controller is coupled with the first drive gear set and the second drive gear set. The controller is configured to synchronize the first drive gear set and the second drive gear set to drive the follower gear in a first direction in a first transmission drive mode, the controller being configured to reverse the direction of the first drive gear set by a phase-shift time period before reversing the direction of the second drive gear set in a transmission reversal mode so as to reduce or eliminate backlash in the first drive gear set prior to engaging the first drive gear set with the follower gear to drive the follower gear in a second direction opposite from the first direction.

20 Claims, 6 Drawing Sheets

Figure 1

PRIOR ART

DUAL MOTOR PHASE CONTROLLED REVERSING TRANSMISSION

BACKGROUND OF THE INVENTION

This invention relates generally to mechanical transmission apparatus and, more particularly, to gear-based transmission apparatus having little or no backlash effects.

Gear based transmission represents a very rigid and cost effective method for transmitting large forces at a very low cost when compared to cable and belt based transmissions. Gear based transmissions, however, must maintain clearance between the mating teeth of the gear sets that make up the gear train. This clearance, called backlash, exists in even the most precise of mechanisms to allow for misalignment, manufacturing variances, and material expansion and contraction due to temperature changes. In devices that are designed to transmit a torque or other forces in rapidly changing environments, such as force feed back mechanisms in simulator input devices, this backlash diminishes the response of the transmission system. For instance, when the input device needs to reverse the transmission of a force, the backlash causes a delay in the system response. This delay is particularly problematic for devices that use gear based transmissions to transmit torque and reverse direction rapidly while maintaining a high frequency response.

As the frequency of the system increases, the forces transmitted by the input device may decrease to such a degree that the time required to fully reverse the transmission exceeds the time needed to remove the clearance between the teeth, thereby resulting in no transmission of force at all. The problem of backlash limits the ability of the device to simulate effectively actual real world behavior, reducing its value in program simulation.

BRIEF SUMMARY OF THE INVENTION

Embodiments of the present invention are directed to gear based transmission apparatus that are configured to reduce or eliminate the backlash effects. Controlling the backlash effects is particularly advantageous, for instance, for devices that use gear based transmissions to transmit torque and reverse direction rapidly while maintaining high frequency response. In specific embodiments, a dual motor, microprocessor controlled transmission is used to eliminate the backlash effects and improve the frequency response of the transmission. The dual motor transmission includes two motors with respective gears forming a double gear set. By controlling the motors individually to reverse out of phase with respect to one another, the backlash is systematically removed from one side of the gear set at a time. While the first motor maintains the force on the transmission, the second motor is removing the clearance between the gear teeth of the second gear set. Once the backlash is removed and the gear teeth of the second gear set are engaged to turn in the reverse direction, the second motor applies the required forces in the reverse direction, allowing the first motor to reverse and remove the backlash in the first gear set. The elimination of backlash by out-of-phase reversing transmission not only greatly improves frequency response, but it also reduces the noise caused by the gears during reversal.

In accordance with an aspect of the present invention, a transmission apparatus comprises a follower gear, a first drive gear set coupled with the follower gear to drive the follower gear, and a second drive gear set coupled with the follower gear to drive the follower gear. The first drive gear set includes at least one gear, and the second drive gear set includes at least one gear. A controller is coupled with the first drive gear set and the second drive gear set. The controller is configured to synchronize the first drive gear set and the second drive gear set to drive the follower gear in a first direction in a first transmission drive mode. The controller is configured to reverse the direction of the first drive gear set by a phase-shift time period before reversing the direction of the second drive gear set in a transmission reversal mode so as to reduce or eliminate backlash in the first drive gear set prior to engaging the first drive gear set with the follower gear to drive the follower gear in a second direction opposite from the first direction.

In some embodiments, the phase-shift time period is determined by the backlash in the first drive gear set and a speed of the follower gear. The phase-shift time period may be set to reverse the direction of the second drive gear set as soon as the backlash in the first drive gear set is at least substantially eliminated. The first drive gear set comprises a first motor pinion to be driven by a first motor, and a first drive gear coupled with the first motor pinion to be driven by the first motor pinion and having a first drive pinion connected therewith. The first drive pinion is coupled with the follower gear to drive the follower gear. The first drive gear set and the second drive gear set may be substantially symmetrically arranged with respect to the follower gear. The first drive gear set and the second gear set may be identical. The first drive gear set and the second gear set may have substantially the same amount of backlash. In specific embodiments, the controller is configured to synchronize the first drive gear set and the second drive gear set to drive the follower gear in the second direction in a second transmission drive mode after reversing the direction of the second drive gear set to reduce or eliminate backlash in the second drive gear set.

In accordance with another aspect of the present invention, a method of reducing or eliminating backlash effects in a gear transmission comprises providing a first drive gear set which includes at least one gear, providing a second drive gear set which includes at least one gear, and coupling the first drive gear set and the second drive gear set with a follower gear to individually drive the follower gear. The first drive gear set and the second drive gear set are controlled to synchronize the first drive gear set and the second drive gear set to drive the follower gear in a first direction in a first transmission drive mode. The direction of the first drive gear set is reversed by a phase-shift time period before reversing the direction of the second drive gear set in a transmission reversal mode so as to reduce or eliminate backlash in the first drive gear set prior to engaging the first drive gear set with the follower gear to drive the follower gear in a second direction opposite from the first direction.

In some embodiments, the method further comprises controlling the first drive gear set and the second drive gear set to synchronize the first drive gear set and the second drive ear set to drive the follower gear in the second direction in a second transmission drive mode after reversing the direction of the second drive gear set to reduce or eliminate backlash in the second drive gear set.

In accordance with another aspect of the present invention, a transmission apparatus comprises a follower gear, first drive means coupled with the follower gear to drive the follower gear, and second drive means coupled with the follower gear to drive the follower gear. A controller is coupled with the first drive means and the second drive means. The controller is configured to synchronize the first drive means and the second drive means to drive the follower gear in a first direction in a first transmission drive mode. The controller is configured to reverse the direction of the first drive means by a phase-shift time period before reversing the direction of the second drive means in a transmission reversal mode so as to reduce or eliminate backlash in the first drive means prior to engaging the first drive means with the follower gear to drive the follower gear in a second direction opposite from the first direction.

DETAILED DESCRIPTION OF THE INVENTION

Figure 1:
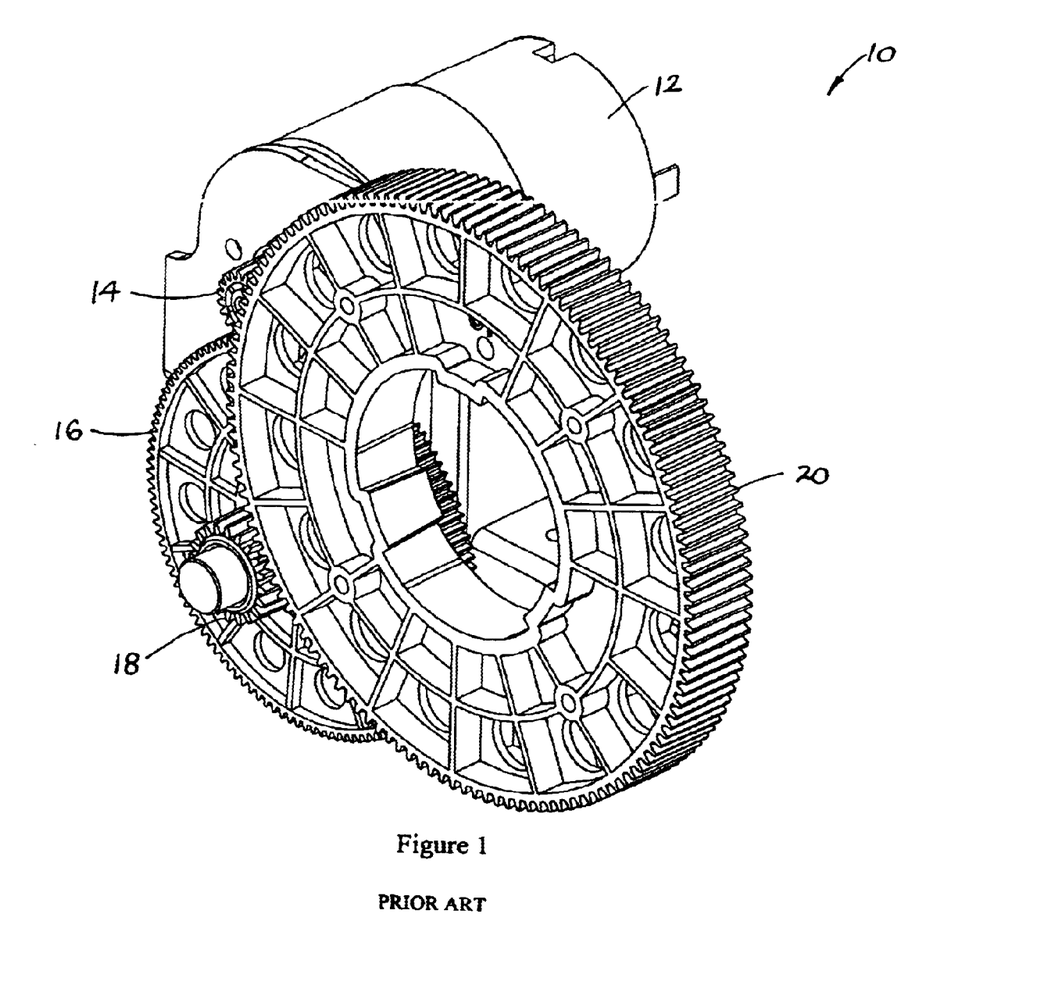
FIG. 1 is a perspective view of a single motor transmission apparatus.
Figure 2:
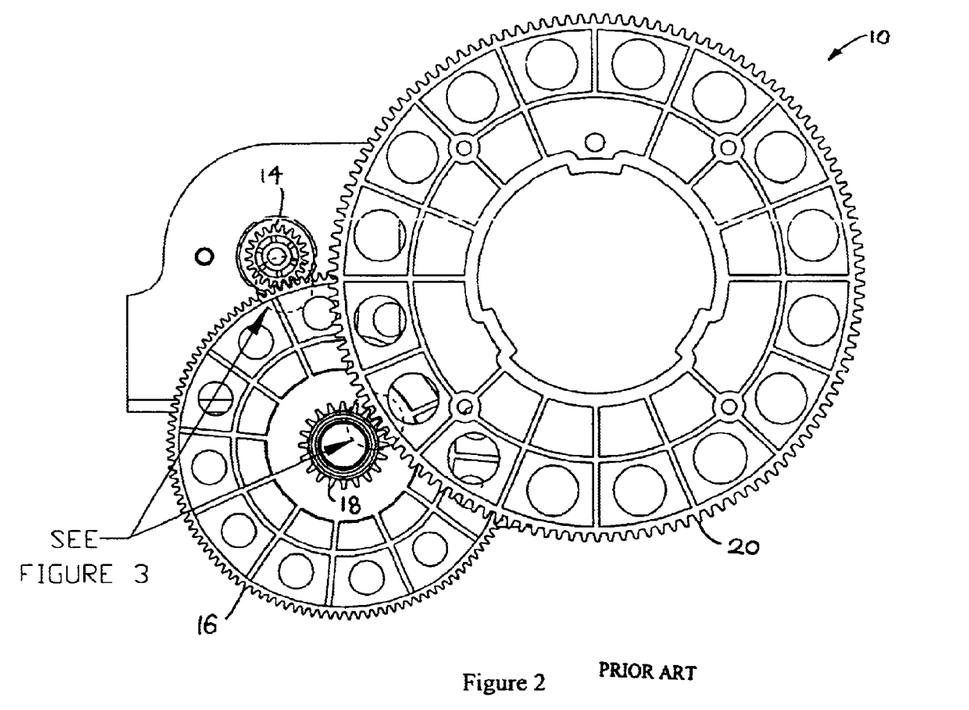
FIG. 2 is an elevational view of the single motor transmission apparatus of FIG. 1.

FIGS. 1 and 2 show a single motor transmission apparatus 10 having a motor 12 for driving a motor pinion 14, which in turn rotates a drive gear 16 having a drive pinion 18 connected therewith. The drive pinion 18 is coupled with a follower gear 20 to drive it in rotation.

Figure 3:
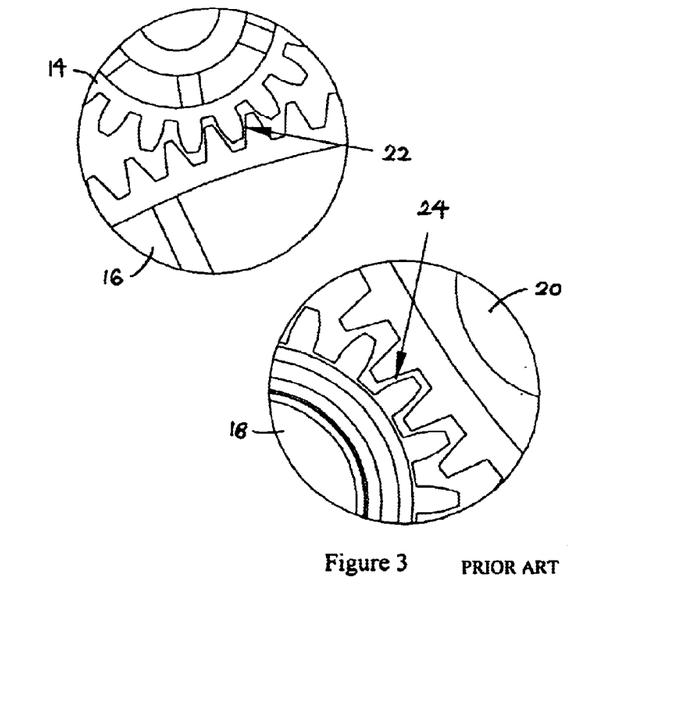
FIG. 3 is a schematic view of the gear teeth in the single motor transmission apparatus of FIG. 1 illustrating the backlash.

FIG. 3 illustrates the backlash that exists between the gears in the transmission apparatus 10. The backlash is shown as the clearance 22, 24 between the mating teeth of each pair of the plurality of gears that make up the gear train or system. FIG. 3 shows the clearance 22 between the motor pinion 14 and the drive gear 16 and the clearance 24 between the drive pinion 18 and the follower gear 20. The clearances 22, 24 are provided to allow for misalignment, manufacturing variances, and material expansion and contraction due to temperature changes.

Figure 4:
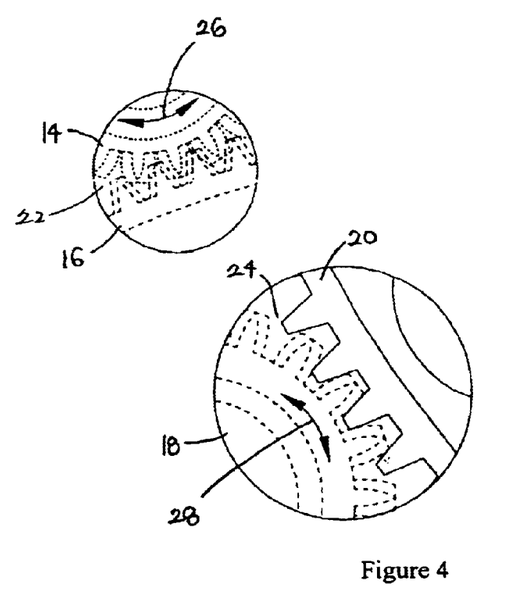
FIG. 4 is a schematic view of the gear teeth in the single motor transmission apparatus of FIG. 1 illustrating the backlash effects during transmission reversal.

The clearances 22, 24 inherently decrease the response of the transmission apparatus 10, which is particularly problematic when the apparatus 10 is used to transmit torque and reverse direction rapidly while maintaining a high frequency response. As illustrated in FIG. 4 for the transmission apparatus 10, the backlash 22 between the motor pinion 14 and the drive gear 16 causes a delay in response when the motor pinion 14 reverses direction to engage the drive gear 16 in the opposite direction, as indicated by arrows 26. The drive gear 16 is connected to the drive pinion 18, and experiences additional delay in response due to the backlash 24 between the drive pinion 18 and the follower gear 20. When the drive gear 16 and the drive pinion 18 connected therewith change direction to engage the follower gear 20 in the opposite direction as indicated by arrows 28, the backlash 24 causes the additional delay in response. As the frequency of the apparatus 10 increases, the forces transmitted by the motor 12 may decrease to such a degree that the time required to fully reverse the transmission exceeds the time needed to remove the clearances 22, 24 between the gear teeth, thereby resulting in no transmission at all.

Figure 5:
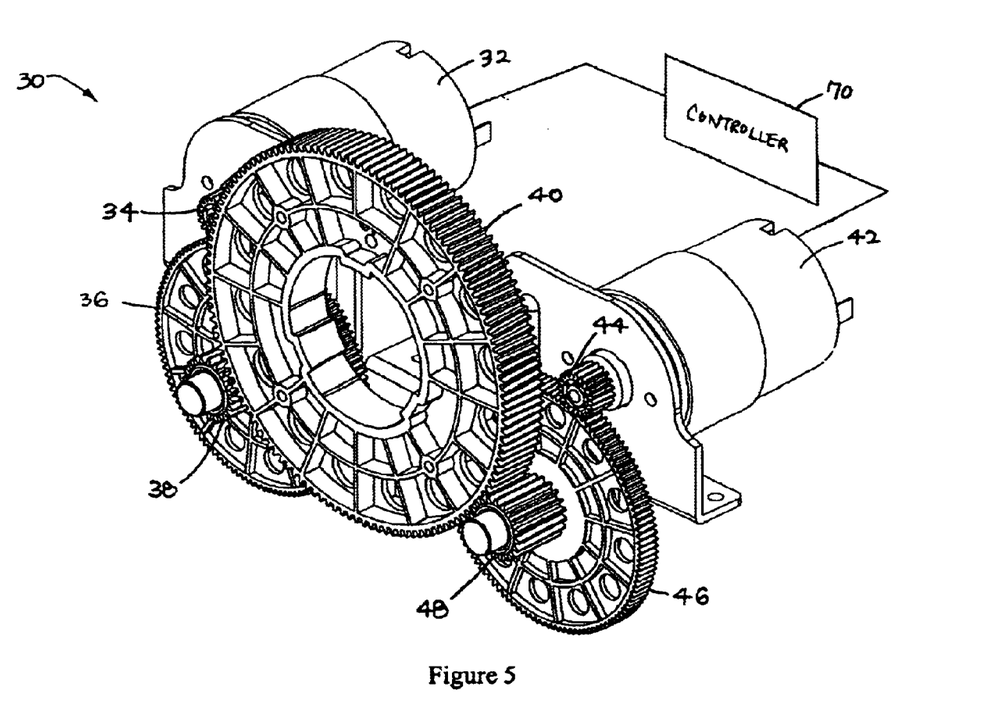
FIG. 5 is a perspective view of a dual motor transmission apparatus according to an embodiment of the present invention.
Figure 6:
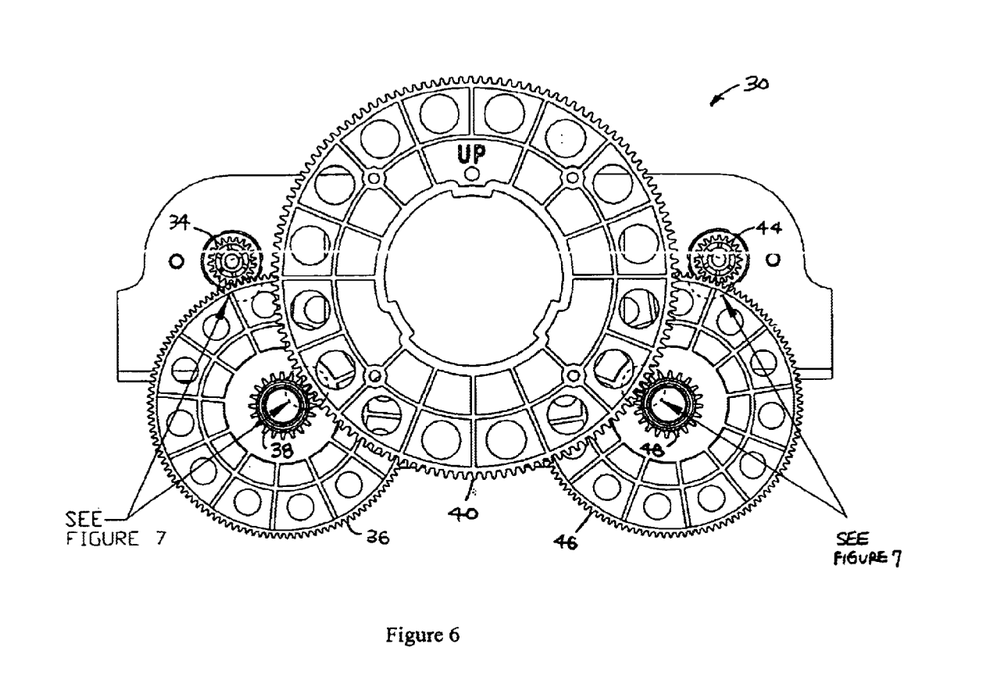
FIG. 6 is an elevational view of the dual motor transmission apparatus of FIG. 5.

FIGS. 5 and 6 show an embodiment of a dual motor transmission apparatus 30 having a first motor 32 for driving a first motor pinion 34, which in turn rotates a first drive gear 36 having a first drive pinion 38 connected therewith. The first drive pinion 18 is coupled with a follower gear 40 to drive it in rotation in the first drive gear set. A second motor 42 is provided for driving a second motor pinion 44, which in turn rotates a second drive gear 46 having a second drive pinion 48 connected therewith. The second drive pinion 38 is also coupled with the follower gear 40 to drive it in rotation in the second drive gear set. In the specific embodiment shown, the first gear set and the second gear are identical and symmetrically arranged with respect to the follower gear 40.

Figure 7:
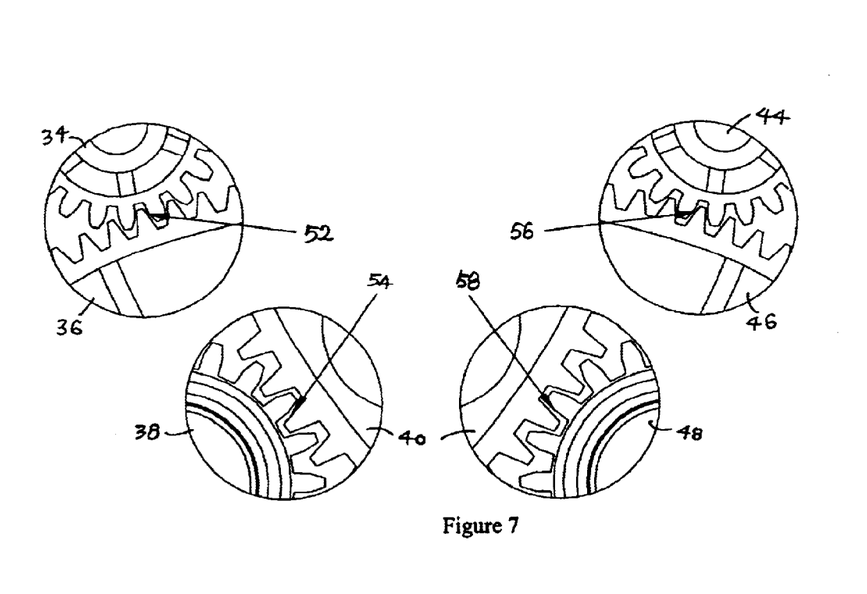
FIG. 7 is a schematic view of the gear teeth in the dual motor transmission apparatus of FIG. 5 illustrating the backlash.

FIG. 7 illustrates the backlash that exists between the gears in the transmission apparatus 30. The backlash results from the clearance 52 between the first motor pinion 34 and the first drive gear 36, the clearance 54 between the first drive pinion 38 and the follower gear 40, the clearance 56 between the second motor pinion 44 and the second drive gear 46, and the clearance 58 between the second drive pinion 48 and the follower gear 40. For ease and cost of manufacturing, generally the same amount of backlash is typically maintained in each side of the double gear set.

Figure 8:
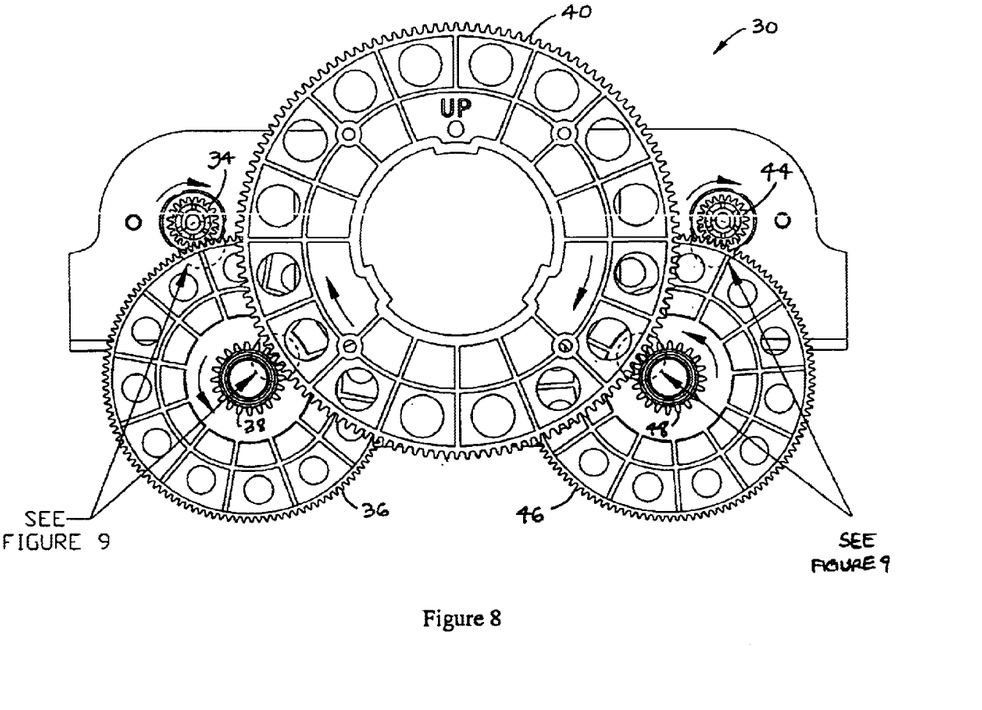
FIG. 8 is an elevational view of the dual motor transmission apparatus of FIG. 5 illustrating a transmission drive mode.
Figure 9:
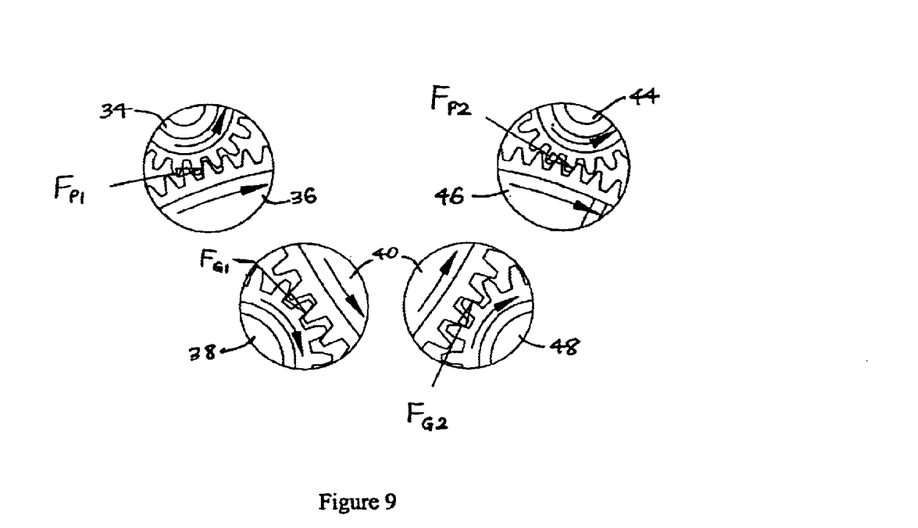
FIG. 9 is a schematic view of the gear teeth in the dual motor transmission apparatus of FIG. 8 illustrating the forces in the transmission drive mode.
Figure 10:
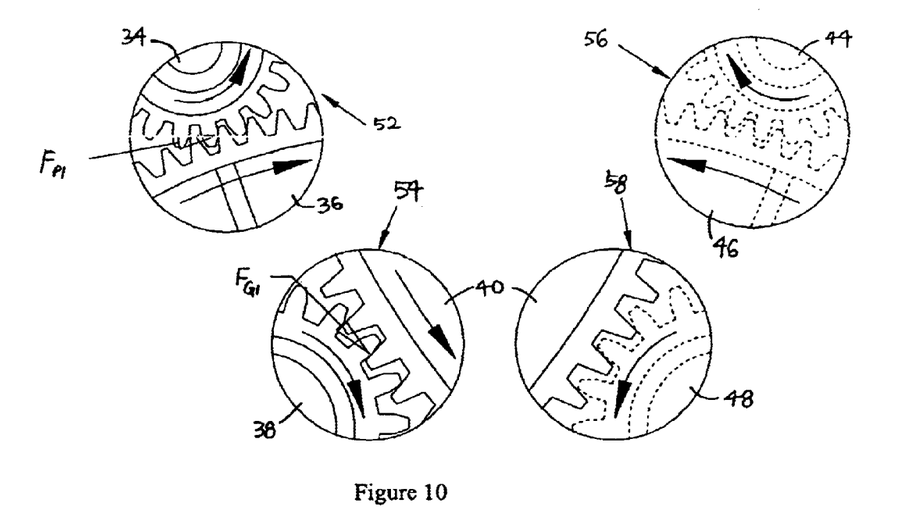
FIG. 10 is a schematic view of the gear teeth in the dual motor transmission apparatus of FIG. 8 in a transmission reversal mode illustrating an out-of-phase reversal of one of the two gear sets to eliminate the backlash in that one gear set according to an embodiment of the present invention.
Figure 11:
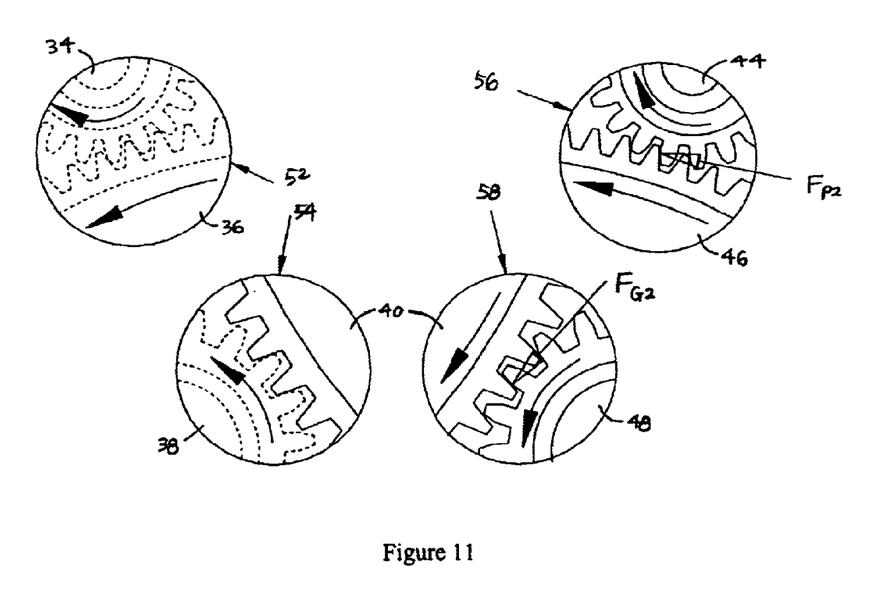
FIG. 11 is a schematic view of the gear teeth in the dual motor transmission apparatus of FIG. 8 illustrating subsequent reversal of the other gear set to eliminate the backlash in that other gear set according to an embodiment of the present invention.

By controlling the two motors 32, 42 individually, the backlash is systematically removed from one side of the gear set at a time by reversing the motors 32, 42 out of phase with respect to one another. An example is shown in FIGS. 8–11 to demonstrate the systematic removal of backlash. As seen in FIG. 8, the two motors 32, 42 drive the drive pinions 34, 55 both to rotate in the same clockwise direction to cause the follower gear 40 to also rotate in the clockwise direction. FIGS. 9–11 illustrate reversing the transmission apparatus 30 from a counterclockwise direction to the clockwise direction shown in FIG. 8.

Initially in a first transmission drive mode, the motor pinions 34, 44 rotate in the counterclockwise direction, which cause the drive gears 36, 46 and the corresponding drive pinions 38, 48 to rotate in the clockwise direction, which in turn drive the follower gear 40 to rotate in the counterclockwise direction, as shown in FIG. 9. The first motor pinion 34 exerts a force $F_{P1}$ on the first drive gear 36, which through the first drive pinion 38, exerts a force $F_{G1}$ on the follower gear 40. The second motor pinion 44 exerts a force $F_{P2}$ on the second drive gear 46, which through the second drive pinion 48, exerts a force $F_{G2}$ on the follower gear 40.

FIG. 10 illustrates the transmission reversal mode of the transmission apparatus 30. The second motor 42 reverses in direction while the first motor 32 continues to drive the first motor pinion 34 in the counterclockwise direction and maintain the forces $F_{P1}$, $F_{G1}$ on the transmission through the first gear set. This allows the backlash 56, 58 in the second gear set to be removed, as seen in FIG. 10. After removal of the backlash 56, 58, second motor pinion 44 exerts a force $F_{P2}$ on the second drive gear 46 in the opposite direction, which through the second drive pinion 48, exerts a force $F_{G2}$ on the follower gear 40 in the opposite direction to produce a clockwise rotation of the follower gear 40, as shown in FIG. 11. As soon as this occurs, the first motor 32 reverses in direction. The delay in reversing the first motor 32 with respect to the second motor 42 is the phase-shift time period, which is determined by the backlash in the second gear set and the speed of rotation of the follower gear. The phase-shift time period is desirably set to reverse the direction of the first motor 32 as soon as the backlash 56, 58 in the second gear set is at least substantially removed (e.g., at least about 90%, more desirably about 95%, removed).

While the second motor maintains the forces $F_{P2}$, $F_{G2}$ on the transmission through the second gear set, the reversal of the first motor 32 allows the backlash 52, 54 to be removed from the first gear set, as shown in FIG. 11. The two motors 34, 44 subsequently drive the transmission apparatus 30 to rotate the follower gear 40 in the clockwise direction, as shown in the second transmission drive mode of FIG. 8.

To control the two motors 34, 44 to reverse out of phase with respect to one another, a controller 70, as seen in FIG. 5. The controller 70 may be, for example, a microprocessor. Typically, a sensor such as an optical encoder is used to measure or monitor the direction and rate of movement of the input device, which may be a steering wheel, a joystick, or the like. The output of the sensor is provided to the controller 70, which can determine the timing of out-of-phase motor reversal based on the gap sizes of the gear teeth in the transmission apparatus 30. The controller 70 desirably controls the motor reversal of the motors 32, 42 to avoid locking or interference between the dual motors and their associated gear sets and to ensure smooth transmission reversal and operation of the device. The elimination of backlash by out-of-phase reversing transmission not only greatly improves frequency response, but it also reduces the noise caused by the gears during reversal.

The above-described arrangements of apparatus and methods are merely illustrative of applications of the principles of this invention and many other embodiments and modifications may be made without departing from the spirit and scope of the invention as defined in the claims. For instance, gear sets other than those shown may be used. Alternative gear sets may have different numbers of gears, different gear sizes, different gear arrangements, and the like. The scope of the invention should, therefore, be determined not with reference to the above description, but instead should be determined with reference to the appended claims along with their full scope of equivalents.

What is claimed is:

1. A transmission apparatus comprising:
   a follower gear;
   a first drive gear set coupled with the follower gear to drive the follower gear, the first drive gear set including at least one gear; and
   a second drive gear set coupled with the follower gear to drive the follower gear, the second drive gear set including at least one gear; and
   a controller coupled with the first drive gear set and the second drive gear set, the controller being configured to synchronize the first drive gear set and the second drive gear set to drive the follower gear in a first direction in a first transmission drive mode, the controller being configured to reverse the direction of the first drive gear set by a phase-shift time period before reversing the direction of the second drive gear set in a transmission reversal mode so as to reduce or eliminate backlash in the first drive gear set prior to engaging the first drive gear set with the follower gear to drive the follower gear in a second direction opposite from the first direction.

2. The transmission apparatus of claim 1 wherein the phase-shift time period is determined by the backlash in the first drive gear set and a speed of the follower gear.

3. The transmission apparatus of claim 2 wherein the phase-shift time period is set to reverse the direction of the second drive gear set as soon as the backlash in the first drive gear set is at least substantially eliminated.

4. The transmission apparatus of claim 1 wherein the first drive gear set comprises a first motor pinion to be driven by a first motor, and a first drive gear coupled with the first motor pinion to be driven by the first motor pinion and having a first drive pinion connected therewith, the first drive pinion being coupled with the follower gear to drive the follower gear.

5. The transmission apparatus of claim 1 wherein the first drive gear set and the second drive gear set are substantially symmetrically arranged with respect to the follower gear.

6. The transmission apparatus of claim 1 wherein the first drive gear set and the second gear set are identical.

7. The transmission apparatus of claim 1 wherein the first drive gear set and the second gear set have substantially the same amount of backlash.

8. The transmission apparatus of claim 1 wherein the controller is configured to synchronize the first drive gear set and the second drive gear set to drive the follower gear in the second direction in a second transmission drive mode after reversing the direction of the second drive gear set to reduce or eliminate backlash in the second drive gear set.

9. A method of reducing or eliminating backlash effects in a gear transmission, the method comprising:
   providing a first drive gear set which includes at least one gear;
   providing a second drive gear set which includes at least one gear;
   coupling the first drive gear set and the second drive gear set with a follower gear to individually drive the follower gear; and
   controlling the first drive gear set and the second drive gear set to synchronize the first drive gear set and the second drive gear set to drive the follower gear in a first direction in a first transmission drive mode; and
   reversing the direction of the first drive gear set by a phase-shift time period before reversing the direction of the second drive gear set in a transmission reversal mode so as to reduce or eliminate backlash in the first drive gear set prior to engaging the first drive gear set with the follower gear to drive the follower gear in a second direction opposite from the first direction.

10. The method of claim 9 further comprising determining the phase-shift time period based on the backlash in the first drive gear set and a speed of the follower gear.

11. The method of claim 10 wherein the phase-shift time period is set to reverse the direction of the second drive gear set as soon as the backlash in the first drive gear set is at least substantially eliminated.

12. The method of claim 9 wherein the first drive gear set comprises a first motor pinion to be driven by a first motor, and a first drive gear coupled with the first motor pinion to be driven by the first motor pinion and having a first drive pinion connected therewith, the first drive pinion being coupled with the follower gear to drive the follower gear.

13. The method of claim 9 wherein the first drive gear set and the second drive gear set are substantially symmetrically arranged with respect to the follower gear.

14. The method of claim 9 wherein the first drive gear set and the second gear set are identical.

15. The method of claim 9 wherein the first drive gear set and the second gear set have substantially the same amount of backlash.

16. The method of claim 9 further comprising controlling the first drive gear set and the second drive gear set to synchronize the first drive gear set and the second drive gear set to drive the follower gear in the second direction in a second transmission drive mode after reversing the direction of the second drive gear set to reduce or eliminate backlash in the second drive gear set.

17. A transmission apparatus comprising:

a follower gear;

first drive means coupled with the follower gear to drive the follower gear;

second drive means coupled with the follower gear to drive the follower gear; and a controller coupled with the first drive means and the second drive means, the controller being configured to synchronize the first drive means and the second drive means to drive the follower gear in a first direction in a first transmission drive mode, the controller being configured to reverse the direction of the first drive means by a phase-shift time period before reversing the direction of the second drive means in a transmission reversal mode so as to reduce or eliminate backlash in the first drive means prior to engaging the first drive means with the follower gear to drive the follower gear in a second direction opposite from the first direction.

18. The transmission apparatus of claim 17 wherein the phase-shift time period is determined by the backlash in the first drive means and a speed of the follower gear.

19. The transmission apparatus of claim 17 wherein the phase-shift time period is set to reverse the direction of the second drive means as soon as the backlash in the first drive means is at least substantially eliminated.

20. The transmission apparatus of claim 17 wherein the controller is configured to synchronize the first drive means and the second drive means to drive the follower gear in the second direction in a second transmission drive mode after reversing the direction of the second drive means to reduce or eliminate backlash in the second drive means.

* * * * *